United States Patent [19]

Pigneri et al.

[11] Patent Number: 4,916,203
[45] Date of Patent: Apr. 10, 1990

[54] CURABLE RESIN COMPOSITION FROM EPOXY COMPOUND AND PROPARGYL AROMATIC ETHER

[75] Inventors: Anthony M. Pigneri, Houston; James Vick, III, deceased, late of Katy, Tex., by Janet I. Vick, executrix

[73] Assignee: Shell Oil Company, Houston, Tex.

[21] Appl. No.: 271,132

[22] Filed: Nov. 14, 1988

[51] Int. Cl.$^4$ ............................................. C08G 59/40
[52] U.S. Cl. ..................................... 528/101; 528/97; 528/98; 528/99; 528/92; 528/94; 525/481; 525/482; 525/502; 525/483; 525/484; 525/121; 525/423; 523/443; 523/444; 523/445; 523/468; 428/413; 428/416; 428/418
[58] Field of Search ................. 528/101, 92, 94, 97, 528/98, 99; 525/481, 482–484, 502, 121, 423; 523/443–445, 468; 428/413, 416, 418

[56] References Cited

U.S. PATENT DOCUMENTS

| | | | |
|---|---|---|---|
| 2,792,381 | 5/1957 | Shokal et al. | 528/110 |
| 3,149,168 | 9/1964 | Karlan et al. | 528/101 |
| 3,725,341 | 4/1973 | Rogers et al. | 528/101 |
| 3,816,374 | 6/1974 | White | 526/273 |
| 4,183,869 | 1/1980 | Bilow | 528/99 |
| 4,298,720 | 1/1981 | Yamazaki et al. | 525/445 |
| 4,670,308 | 1/1987 | Krapczyk | 525/298 |
| 4,835,232 | 5/1989 | Schornick et al. | 526/282 |

FOREIGN PATENT DOCUMENTS

| | | | |
|---|---|---|---|
| 54-12738 | 10/1979 | Japan . | |
| 62-257936 | 11/1987 | Japan | 528/98 |
| 529138 | 2/1977 | U.S.S.R. . | |

OTHER PUBLICATIONS

CA 76(1):3563r, "Pesticidal Phenyl Derivatives".
Dirlikov et al., Proceedings of ACS Div. of Polymeric Materials: Science & Engineering, 59, Fall 1988, Los Angeles.

*Primary Examiner*—John Kight, III
*Assistant Examiner*—Frederick Krass

[57] ABSTRACT

A curable resin composition comprises an epoxy compound and a propargyl aromatic ether.

26 Claims, No Drawings

CURABLE RESIN COMPOSITION FROM EPOXY COMPOUND AND PROPARGYL AROMATIC ETHER

BACKGROUND OF THE INVENTION

1. Field of the Invention

The present invention relates to curable resin compositions comprising an epoxy compound and a propargyl aromatic ether.

2. State of the Art

A variety of epoxy resins are known in the art for use as matrix resins for fiber reinforced materials, particularly for electrical and electronic applications. Frequently, other materials are combined with epoxy compounds to form blends. However, such blends do not have the most desirable combination of properties for certain applications.

SUMMARY OF THE INVENTION

The present invention is directed to a curable resin composition comprising:
(a) an epoxy compound and
(b) a propargyl aromatic ether.

The compositions of the invention are useful for composites and the like, have good glass transition temperatures and coefficients of thermal expansion and are curable even without the aid of a catalyst.

Suitable epoxy compounds useful in the invention composition include any curable epoxy resin having, on the average, more than one vicinal epoxide group per molecule. The epoxy resin can be saturated or unsaturated, aliphatic, cycloaliphatic, aromatic or heterocyclic, and can bear substituents which do not materially interfere with the curing reaction. They may be monomeric or polymeric.

For example, the epoxy compound is a high molecular weight compound containing at least 1, especially at least 2, epoxy groups in the molecule. Generally, in view of the adhesion or intimate contact of the final resin products, the epoxy compounds desirably have an epoxy equivalent of 70 to 6000, especially 170 to 4000. One type of epoxy compound that can be suitably used in this invention is a bisepoxy compound of the following general formula (1):

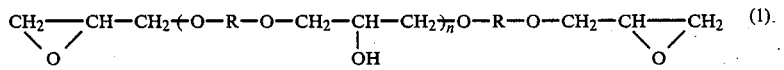

wherein n is zero or a positive number, preferably 0 to 12 and R is an aromatic group of formula

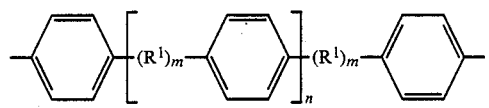

wherein each m is independently zero or 1; n is zero or 1; and each $R^1$ is independently a divalent aliphatic or aromatic (aryl) hydrocarbon or aromatic ether group containing up to 14 carbon atoms, an oxygen atom, a sulfur atom, a carbonyl group, a sulfonyl group, a sulfinyl group, an alkyleneoxyalkylene group containing up to 4 carbon atoms in each alkylene group, an imino group,

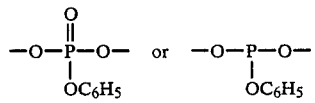

or a group derived from novalac-type phenol or resorcinol resins.

These epoxy compounds, depending upon the extent of polymerization or the type of the divalent organic group contained in the main chain, are available in a wide range of forms from relatively low viscosity liquid to relatively high melting solid, but all of such epoxy compounds can be used in the present invention.

These epoxy compounds, especially bisepoxy compounds, are prepared by reacting polyhydric phenols with epihalohydrins such as epichlorohydrin in the presence of a base such as an alkali hydroxide. Instead of reacting polyhydric phenols with epihalohydrins, di or poly amines (diamines being preferred) can be reacted with epihalohydrin to form bisepoxy compounds. The diamines are preferably aromatic diamines in view of the thermal stability of the final resins. When it is desired to improve the flexibility of suppleness of the resin, alicyclic diamines can be used alone or in combination with the aromatic diamines. From the viewpoint of reactivity, the diamines are preferably primary diamines, but secondary diamines can also be used. The diamines are preferably aromatic diamines in view of the thermal stability of the final resins. Examples of the diamines that can be used in this invention include (i) diamines of the general formula $$H_2N-R^3-NH_2$$

wherein $R^3$ is a divalent aromatic or alicyclic organic group containing up to about 24 carbon atoms. Examples of suitable diamines are m-phenylene diamine, m-, or p-xylylenediamine, 1,4-cyclohexane diamine, hexahydroxylylene diamine, 4,4'-bisaminophenyl methane, 4,4'-bisaminophenyl sulfone, bis(4-amino-3-methyl-phenyl) methane (MDT), bis(4-amino-3,5-dimethylphenyl)methane (MDX), 4,4'bisaminophenylcyclohexane, 4,4'-bisaminophenyl ether, 2,2-bis(4'-aminophenyl)-propane, 2,2-bis(4-amino-3-methylphenyl)methane, and α,α'-bis(4-amino-phenyl)-phenylmethane, and α,α'-bis(4-aminophenyl)-p-diisopropenylbenzene and the like.

Examples of epoxy compounds readily available and suitable for use in this invention are those derived from bisphenol A, or a chlorine- or bromine-substituted derivative of bisphenol A and epihalohydrins, or epoxy compounds derived from a precondensate of phenol and formaldehyde and epihalohydrins.

Suitable epoxy compounds as described above are disclosed in U.S. Pat. No. 4,110,364, the disclosures of which are incorporated by reference.

For example, epoxy resins include glycidyl ethers prepared by the reaction of epichlorohydrin with a compound containing at least one hydroxyl group carried out under alkaline reaction conditions. The epoxy resin products obtained when the hydroxyl group-containing compound is bisphenol A are represented by formula 2 below:

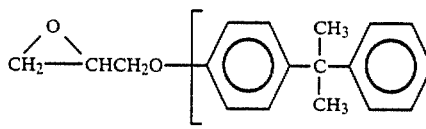 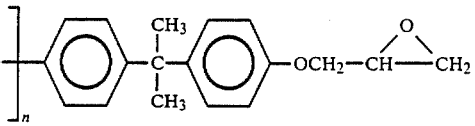

wherein n is zero or a number greater than 0, commonly in the range of 0 to 10, preferably in the range of 0 to 2. Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the invention compositions have molecular weights generally within the range of 100 to about 10,000, preferably about 200 to about 1500. The commercially available liquid epoxy resin EPON ® Resin 828, a reaction product of epichlorohydrin and 2,2-bis(4-hydroxyphenyl)propane (bisphenol A) having a molecular weight of about 400, an epoxide equivalent (ASTM D-1652) of about 185–192, and an n value in the formula above of about 0.2, is presently the preferred epoxy resin because of its low viscosity and commercial availability.

Other suitable epoxy resins known in the art include the reaction products of an allyl halide with a phenol and peroxide or fusion epoxies which include the reaction product in the absence of a solvent of a carboxylic acid or anhydride or a phenol with a compound containing at least one vic-epoxy group including those disclosed in U.S. Pat. Nos. 4,634,757 and 4,528,356.

Preferably, the invention composition contains a halogenated, preferably brominated, epoxy resin as the epoxy compound. The brominated epoxy resin is a reaction product of a halogenated polyhydric phenol with epichlorohydrin having an average weight per epoxide (WPE) within the range of about 450 to about 1200, preferably from about 450 to about 650. Preferably, the brominated epoxy resin will have a halogen content within the range of about 10 to about 50 percent, most preferably about 15 to about 40 percent. The halogenated epoxy resin will generally be employed in such a manner as to provide a cured composition having a flame retardance rating of at least UL 94 V-1, preferably V-0. The halogenated phenol is preferably tetrabromobisphenol A because of the high degree of flame retardance imparted by the resulting epoxy resin. The halogenated epoxy resin is present in the composition in an amount within the range of about 10 to about 90 weight percent, preferably about 60 to about 85 weight percent, based on the weight of the composition. A suitable brominated epoxy is available commercially as M&T THERMOGUARD ®210, a reaction product of tetrabromobisphenol-A and epichlorohydrin having a WPE of about 500–600 and especially EPON ® Resin 1123, a brominated bisphenol A epoxy resin.

The propargyl aromatic ethers useful in the present inventions are compounds having at least two propargyl ether groups directly attached to ring carbon atoms of an aromatic (aryl) organic group containing from 6 to about 100 carbon atoms comprising an aromatic ring or an aromatic ring (a) bonded directly or through a bridging atom or group to or (b) fused to one or more aromatic or cycloaliphatic rings, each aromatic ring of R having from zero to all the avialable ring positions independently substituted by the propargyl ether groups. Suitable proparagyl aromatic ether monomers include those di- and polypropargyl aromatic ethers represented by the formula (3)

wherein n is a number of at least 2, and R is an aromatic (aryl) organic group and the propargyl ether groups are bonded to ring carbon atoms of the aromatic ring(s) of R. Suitable aromatic organic groups for R, include (i) residues having a valence of at least 2 and derived from aromatic hydrocarbons containing 6 to 16 carbon atoms, such as benzene, naphthalene, anthracene or pyrene;

(ii) organic groups consisting of a plurality of aromatic rings bonded directly or through a bridging atom or group, for example, those expressed by the following formula (2)

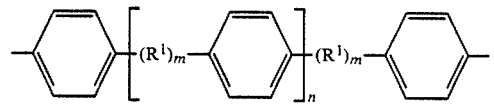

wherein each m is independently zero or 1; n is zero or 1; and each R¹ is independently a divalent aliphatic or aromatic hydrocarbon or aromatic ether group containing up to 14 carbon atoms, an oxygen atom, a sulfur atom, a carbonyl group, a sulfonyl group, a sulfinyl group, an alkyleneoxyalkylene group containing up to 4 carbon atoms in each alkylene group, an imino group

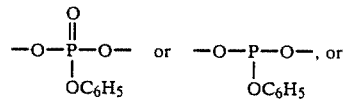

(iii) groups derived from novolac-type phenol or resorcinol resins.

In the compounds of formula 3, preferably R contains up to about 70 carbon atoms when a novolac resin or up to about 40 carbon atoms when R is other than a novolac resin.

The aromatic organic groups R and R¹ can be substituted on their aromatic ring by a substituent which does not participate in the reaction, such as an alkyl group containing 1 to 4 carbon atoms (e.g., methoxy or ethoxy), a halogen atom (e.g., chlorine or bromine), or a nitro group and the like.

Examples of suitable organic groups of the general formula (2) are those derived from biphenyl diphenylmethane, α,α'-dimethylphenylmethane, α,α'-bis(4-hydroxy)-p-diisopropenyl benzene, diphenyl ether, diphenyl dimethylene ether, diphenyl thioether, diphenyl ketone, diphenyl thioether, diphenylamine, diphenyl sulfoxide, diphenyl sulfone, triphenyl phosphite and triphenyl phosphate and the like.

Generally, the propargyl aromatic ether monomers can be prepared by known methods including reacting a di or polyhydric phenolic material with a propargyl halide, such as chloride or bromide, in an aqueous alkaline solution, such as aqueous sodium hydroxide solution as described in U.S. Pat. No. 4,226,800, the disclosures of which are incorporated by reference. One preferred method is by using propargyl chloride in an aqueous sodium hydroxide and a water-miscible, protic co-solvent, which is disclosed and claimed concurrently filed U.S. patent application No. 271,133, the disclosures of which are incorporated by reference. Propargyl aromatic ethers which are readily available and preferred in this invention in view of the properties of the final resin obtained are those prepared by reacting a dihydric phenol, such as bisphenol A with a propargyl chloride or bromide. Likewise propargyl aromatic ethers obtained by the reaction of a phenol-formaldehyde precondensate with a propargyl chloride or bromide can advantageously be used.

The components of the curable resin composition of this invention can be varied over a wide range. Generally, however, the ratio by weight of component (a) to component (b) is in the range of from about 1:99 to about 99:1, preferably from about 85:15 to about 15:85 and usually from about 30:70 to about 85:15. Ratios are conveniently about 50:50. When preparing heat resistant resin having good toughness, from about 10% by weight to about 90% by weight of component (d), usually about 20% to about 60% by weight, is used on the basis of total weight of components (a) and (b). Preferably, a ratio of equivalents of epoxy groups of (a) to propargyl groups of (b) is from about 5:1 to about 1:5.

The curable composition of this invention comprises a mixture of components and can be used in any desired form such as solid, solution or dispersion. These components are mixed in solvent or in the absence of a solvent to form the compositions of this invention. For example, the mixing procedure comprises mixing solutions of component (a) and component (b) either separately or together in a suitable inert organic solvent, such as, for example, ketones such as methyl ethyl ketone, chlorinated hydrocarbons such as methylene chloride, ethers and the like, and homogenizing the resulting mixed solution at room temperature or at an elevated temperature below the boiling point of the solvents to form a composition in the form of a solution. When homogenizing these solutions at room temperature or at an elevated temperature, some reactions may take place between the constituent elements. So long as the resins components are maintained in the state of solution without gelation, such reactions do not particularly affect the operability of the resulting composition in, for example, a bonding, coating, laminating or molding operation.

The curable resin compositions of invention can be used in the above solution form as adhesives, paint vehicles, molding materials to be impregnated in substrates, or laminating materials. In this case, the concentration of the resin solid in the solution is determined so that the optimum operability can be obtained according to the desired utility.

The resin compositions of this invention can be used for various purposes in the form of dried powder, pellets, resin-impregnated product or compound. For example, compositions with the individual components uniformly mixed can be obtained by uniformly mixing the resin components in solution, and then removing the solvents from the homogeneous solution at reduced pressure or at an elevated temperature. Alternatively, solids components (a) and (b) are kneaded at room temperature or at an elevated temperature to form a homogenized resin composition.

The curable composition of this invention may be reticulated by heating it alone to form a cured resin having heat resistance. In general, a catalyst may be used in order to promote crosslinking reaction of the components in the composition, when desired.

Examples of the catalysts include imidazoles, such as 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as diaminobicyclooctane, N,N-dimethyl benzylamine, N,N-dimethylaniline, N,N-dimethyltoluidine, N,N-dimethyl-p-anisidine, p-halogeno-N,N-dimethyl-aniline, 2-N-ethylanilino ethanol, tri-n-butylamine, pyridine, quinoline, N-methylmorpholine, triethanolamine, triethylenediamine, N,N,N',N'-tetramethylbutanediamine, N-methylpiperidine; phenols, such as phenol, cresol, xylenol, resorcinol, and phloroglucin; organic metal complexes or salts, such as copper tetrafluoroborate, lead naphthenate, lead stearate, zinc naphthenate, zinc octoate, tin oleate, dibutyl tin maleate, manganese naphthenate, cobalt naphthenate, and acetyl acetone nickel or bis(triphenylphosphine) palladium II chloride, tetrakis (triphenylphosphine) palladium O, bis(1,2-diphenylphosphino)ethene nickel II chloride, iron; and inorganic metal complexes or salts, such as molybdenum carbonyl, stannic chloride, zinc chloride and aluminum chloride; peroxides, such as benzoyl peroxide, lauroyl peroxide, octanoyl peroxide, acetyl peroxide, para-chlorobenzoyl peroxide and di-t-butyl diperphthalate; acid anhydrides, such as maleic anhydride, phthalic anhydride, fumaric anhydride, pyromellitic anhydride, trimellitic anhydride, hexahydrophthalic anhydride, hexahydropyromellitic anhydride and hexahydrotrimellitic anhydride; azo compounds, such as azoisobutylonitrile, 2,2'-azobispropane, m,m'-azoxystyrene, hydrozones, and mixtures thereof. The amount of catalyst varies considerably according to the type of catalyst, the utility or curing conditions. They can, however, be used in catalytic amounts such as, for example, less than 5% by weight of the total composition.

A variety of additives may be added to the curable composition to impart specific properties provided that they do not impair the essential properties of the resulting resin. Examples of the additives include natural or synthetic resins, fibrous reinforcement, fillers, pigments, dyestuffs, thickening agents, wetting agents, lubricants, flame-retardants and the like.

The resin composition of this invention can also contain a white pigment such a titanium dioxide, a colored pigment such as yellow lead, carbon black, iron black, molybdenum red, prussian blue, ultramarine, cadmium yellow or cadmium red, and other various organic or inorganic dyes and pigments in order to color the compositions. In addition to the above colored pigments, the resin compositions can also contain a rust-proofing pigment such as zinc chromate, red lead, red iron oxide, zinc flower or strontium chromate, an anti-sag agent such as aluminum stearate, a dispersing agent, a thickener, a coat modifier, a body pigment or a fire retardant, which are known additives for paints.

The compositions of this invention are cured by heating after applying it to a substrate as a coating or adhesive layer, or after molding or laminating in the form of powder, pellet or as impregnated in a substrate. The curing conditions of the curable composition of this invention depend on the proportion of components constituting the composition and the nature of the components employed. In general, the composition of this invention may be cured by heating it at a temperature within the range of about 0°–300° C., preferably about 100° C.–250° C., although differing according to the presence of a catalyst or curing agent or its amount, or the types of the components in the composition. The time required for heating is generally 30 seconds to 10 hours, although considerably differing according to whether the resin composition is used as a thin coating or as molded articles of relatively large thickness or as laminates or as matrix resins for fiber reinforced composites, particularly for electrical and electronic applications, e.g., when applied to an electrically non-conductive material and subsequently curing the composition. Suitable fibrous reinforcing materials include glass fibers, quartz fibers, carbon fibers, boron fibers, Kevlar fibers, Teflon® fibers (polytetrafluoroethylene) and the like, with woven or continuous glass fibers or carbon fibers being preferred. The fibrous or reinforcing material is present in the composition in an amount effective to impart increased strength to the composition for the intended purpose, and can be from about 40 to about 95 weight percent, usually about 50 to about 85 weight percent, based on the weight of the total composition. When the resin composition of this invention is used for producing molded articles, laminated articles or bonded structures, the curing is desirably effected under pressure. Generally, this pressure is from 10 to 100 Kg/cm² (gauge).

The composition of this invention cures rapidly, even under mild conditions, so is especially suitable when quantity production and ease of workability are desired. The cured resin made from the composition not only has excellent adhesive force, bond strength, heat resistance, and electric properties, but also is excellent in mechanical properties and resistance to impact, chemicals, moisture and the like. The composition of this invention has a variety of uses as a coating material for rust prevention, flame resistance, flame retardants and the like; as electrical insulating varnish; as adhesive; in laminates to be used for furnitures, building materials, sheathing materials, electrical insulating materials, and the like; and in a variety of moldings.

ILLUSTRATIVE EMBODIMENTS

The present invention is further illustrated by the following examples which are not intended to be construed as limitations upon the invention.

Embodiment 1

A varnish composition was prepared by mixing the following components:

| Component | Amount, g | Order of Addition |
|---|---|---|
| Epoxy resin 1123-4-80 (80% brominated epoxy resin in acetone solution) | 7 | 4 |
| Dipropargyl ether of bisphenol A | 4 | 3 |
| 2-methylimidazole (10% in propylene glycol methyl ether) | 0.96 | 5 |
| Dimethylformamide | 2.2 | 1 |
| Acetone | 2.5 | 2 |

Gels formed from admixture at 167 seconds at 170° C. The resulting gels were tacky at room temperature.

Embodiment 2

A varnish composition was prepared by mixing the following components:

| Component | Amount, g | Order of Addition |
|---|---|---|
| Epoxy resin 1123-4-80 (80% brominated epoxy resin in acetone solution) | 7.1 | 4 |
| Dipropargyl ether of bisphenol A | 4.0 | 3 |
| 2-methylimidazole (10% in propylene glycol methyl ether) | 0.35 | 5 |
| Dimethylformamide | 2.8 | 1 |
| Acetone | 2.5 | 2 |

Gels formed from the admixture at greater than 500 seconds at 170° C. The resulting gels were tacky at room temperature.

Embodiment 3

A varnish composition was prepared by mixing the following components:

| Component | Amount, g | Order of Addition |
|---|---|---|
| Epoxy resin 1123-A-80 (80% brominated epoxy resin in acetone solution) | 11.0 | 1 |
| Dipropargyl ether of bisphenol A | 3.1 | 2 |

A portion of 4.56 g of the above admixture was mixed with 0.51 g of 10% 2-methylimidazole in propylene glycol methyl ether solution.

Gels formed from the admixture at 114 seconds at 170° C. The resulting gels were red-brown in color and solid at room temperature.

Embodiment 4

A varnish composition was prepared by mixing the following components:

| Component | Amount, g | Order of Addition |
|---|---|---|
| Epoxy resin 1123-A-80 (80% brominated epoxy resin in acetone solution) | 42.6 | 4 |
| Dipropargyl ether of bisphenol A | 12.0 | 3 |
| 2-methylimidazole (10% in propylene glycol methyl ether) | 4.62 | 5 |
| Dimethylformamide | 9.00 | 1 |
| Acetone | 9.10 | 2 |

Gels formed from the admixture at 147 seconds at 171° C. with fresh admixture or at 110 seconds at 171° C. with three-day old admixtures.

Prepregs were made by coating 7628-style glass cloth with the above varnish composition and putting the wet-coated glass cloth in a forced draft oven at 163° C. for four minutes. The prepreg gel time was 43 seconds.

Laminates were made by stacking eight sheets of prepregs, pressing the stack at 350° F. and 200 psi for one hour and then post curing by heating for three hours at 220° C. followed by ½ hour at 250° C.

The resulting laminate had the following properties:
Glass transition temperature, TG: 160° C.
Coefficient of thermal expansion, CTE

| Temperature Range, °C. | Average CTE ppm/°C. |
|---|---|
| 25–175 | 18 |
| 175–275 | 168 |
| 40–220 | 53 |

The unique combination of properties of the above composition when formed into laminates and cured makes the compositions of the invention useful as matrix resins for fiber reinforced composites and molding compounds, particularly in the electronic and electrical laminating applications.

What is claimed is:

1. A curable resin composition consisting of:
   (a) a polyepoxy compound which is the reaction product of a polyhydric phenol or a chlorine- or bromine-substituted derivative thereof with an epihalohydrin; and
   (b) a polypropargyl aromatic ether of the formula R—(OCH$_2$—C≡CH)$_n$ wherein R is an aromatic group and n is an integer of 2 or greater, which is the reaction product of a polyhydric phenol and propargyl chloride or bromide.

2. A composition according to claim 1 wherein (a) is a polyepoxy compound of formula (1)

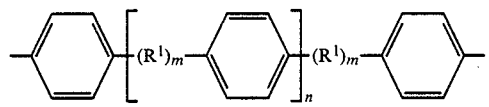

wherein n is zero to 12 and R is an aromatic group of formula

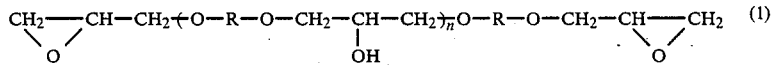

wherein each m is independently zero or 1; n is zero or 1; and each R$^1$ is independently a divalent aliphatic or aromatic hydrocarbon or aromatic ether group containing up to 14 carbon atoms, an oxygen atom, a sulfur atom, a carbonyl group, a sulfonyl group, a sulfinyl group, an alkyleneoxyalkylene group containing up to 4 carbon atoms in each alkylene group, an imino group,

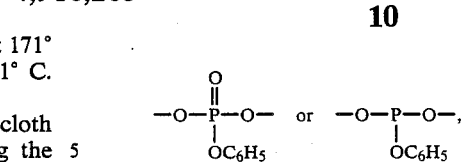

or a group derived from novolac phenol or resorcinol resins.

3. A composition according to claim 1 wherein (a) is the reaction product of bisphenol A or a chlorine- or bromine-substituted derivative thereof with an epihalohydrin.

4. A composition according to claim 3 wherein (a) is the reaction product of a bromine-substituted bisphenol A with an epihalohydrin.

5. A composition according to claim 1 wherein (b) is a dipropargyl ether of bisphenol A.

6. A composition according to claim 1 wherein the weight ratio of component (a) to component (b) is in the range of from about 85:15 to about 15:85.

7. A composition according to claim 6 wherein the weight ratio of (a) to (b) is in the range of about 30:70 to about 85:15.

8. A composition according to claim 7 wherein the weight ratio of (a) to (b) is about 50:50.

9. A composition according to claim 1 wherein (b) is a dipropargyl ether of a symmetrical dihydric phenol.

10. A composition according to claim 9 wherein (a) is the reaction product of bisphenol A or a chlorine- or bromine-substituted derivative thereof with an epihalohydrin.

11. A composition according to claim 10 wherein (a) is the reaction product of a brominated bisphenol A with an epihalohydrin and (b) is a dipropargyl ether of bisphenol A.

12. A composition according to claim 9 wherein the weight ratio of component (a) to component (b) is in the range of about 85:15 to about 15:85.

13. A composition according to claim 10 wherein the weight ratio of component (a) to component (b) is in the range of about 30:70 to about 85:15.

14. A composition according to claim 11 wherein the weight ratio of component (a) to component (b) is 50:50.

15. A cured composition comprising a composition of claim 1 which has been cured by heating at elevated temperature.

16. A composition according to claim 15 which has been cured in the presence of a curing agent.

17. A composition according to claim 16 wherein the curing agent is 2-methylimidazole or copper tetrafluoroborate.

18. A fibrous reinforcing composition comprising a fibrous reinforcing material having applied thereto a composition according to claim 1 which is subsequently cured.

19. A composition according to claim 18 wherein the fibrous reinforcing material is selected from the group consisting of glass fibers, quartz fibers, carbon fibers, boron fibers, Kevlar fibers and polytetrafluoroethylene fibers.

20. A composition according to claim 19 having a glass transition temperature of at least about 150° C.

21. A laminate composition comprising a composition of claim 1.

22. An electrical insulating laminate comprising a composition according to claim 1 applied to an electrically non-conductive material and subsequently cured.

23. A process of preparing a cured resin which comprises heating a composition according to claim 1.

24. A process according to claim 23 conducted in the presence of a curing agent.

25. A process according to claim 24 wherein the curing agent is 2-methylimidazole or copper tetrafluoroborate.

26. A composition according to claim 1 wherein the polypropargyl ether is of a polyhydric phenol, R—(OH)$_n$, in which R is (i) a residue having a valance of at least 2 and derived from an aromatic hydrocarbon containing 6 to 16 carbon atoms;

(ii) an organic group consisting of a plurality of aromatic rings bonded directly or through a bridging atom or group expressed by the following formula (2)

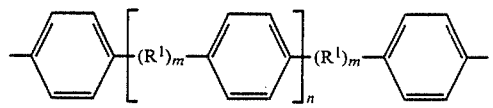

wherein each m is independently zero or 1; n is zero or 1; and each $R^1$ is independently a divalent aliphatic or aromatic hydrocarbon or aromatic ether group containing up to 14 carbon atoms, an oxygen atom, a sulfur atom, a carbonyl group, a sulfonyl group, a sulfinyl group, an alkyleneoxyalkylene group containing up to 4 carbon atoms in each alkylene group, an imino group,

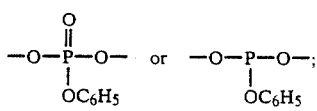

(iii) or a group derived from novolac phenol or resorcinol resins.

* * * * *